United States Patent [19]

Forster et al.

[11] 3,783,383

[45] Jan. 1, 1974

[54] LOW DISPARITY BIPOLAR PCM SYSTEM

[75] Inventors: Daniel Emile Forster, Suresnes; Jean Perrault, Louveciennes, both of France

[73] Assignee: International Standard Electric Corporation, New York, N.Y.

[22] Filed: May 10, 1972

[21] Appl. No.: 252,112

[30] Foreign Application Priority Data

May 28, 1971 France ............................ 71.19563

[52] U.S. Cl.... 325/38 A, 340/347 DD, 178/69.5 R, 340/146.1 AB

[51] Int. Cl. ............................................ H04b 1/00

[58] Field of Search ........................ 325/38 A, 38 R; 178/68, 69.5 R; 179/15 A; 340/347 DD, 146.1 AB

[56] References Cited

UNITED STATES PATENTS

| | | | |
|---|---|---|---|
| 3,300,774 | 1/1967 | Chatelon et al | 340/347 DD |
| 3,048,819 | 8/1962 | Helder et al | 340/146.1 AB |
| 3,349,177 | 10/1967 | Cattermole | 178/68 |
| 3,057,962 | 10/1962 | Mann et al | 178/69.5 R X |
| 3,502,810 | 3/1970 | Aaron et al | 178/68 |
| 3,587,086 | 6/1971 | Chatelon | 340/347 DD |
| 3,671,959 | 6/1972 | Amano | 340/347 DD |
| 3,156,767 | 11/1964 | Van Duuren et al | 340/446.1 AB |

*Primary Examiner*—Charles D. Miller
*Attorney*—C. Cornell Remsen, Jr. et al.

[57] ABSTRACT

There is disclosed herein a signalling process for a PCM transmission system having reduced disparity, that is, a substantially equal number of binary "1" digits for the pulse stream. This is accomplished by complementing normal PCM words if the number of binary "1"s in a word are less than $n/2$, where $n$ is equal to the number of digits per word, and using alternate-polarity bipolar code PCM transmission. In accordance with the present invention the complementing of PCM words is indicated by a polarity violation of the bipolar code of the first digit of the complemented words. This results in two pulses of the same polarity being adjacent each other rather than alternate polarity as is usual in alternate-polarity bipolar PCM. Transmission and reception circuits are also disclosed to implement the PCM signalling process of this invention.

4 Claims, 5 Drawing Figures

PATENTED JAN 1 1974

3,783,383

LOW DISPARITY BIPOLAR PCM SYSTEM

BACKGROUND OF THE INVENTION

The present invention relates to a signalling process for pulse code modulation (PCM) transmission system and more particularly to a process designed for a PCM transmission system utilizing reduced disparity and an alternate polarity bipolar transmission code.

In PCM data transmission, data is sequentially transmitted in form of binary coded numbers or words. A time interval or digit time slot is assigned for transmitting each bit of each word. A a binary "1" bit is represented by the transmission of a pulse and a binary "0" bit is represented by the transmission of no pulse.

At the sending station, digit time slot signals defining time intervals that are assigned to the various bits are generated by a high-stability clock which also provides a bit synchronization signal.

Along a transmission path, data signals are subject to amplitude attenuation and to phase distortion and, therefore, they need to be regenerated in intermediate repeater circuits.

Within regenerative repeaters, data pulses are reshaped, then they are phased at predetermined time positions by a local bit.synchronization signal. Such a synchronization signal is often produced by applying the received signals to be regenerated to a filter tuned to a frequency fr equal to one half the digit repetition frequency and thereby provide a synchronized oscillation. However, synchronization signal amplitude and phase vary with the number of transmitted pulses. The synchronization signal amplitude is essentially proportional to the average number of transmitted pulses per word.

Various coding processes have been suggested in order to increase the average number of transmitted pulses (binary "1"s) per word, that is, to obtain a code disparity reduction. In particular, in U. S. Pat. No. 3,300,774, whose disclosure is incorporated herein by reference, there is described a transmission process wherein each binary word is transmitted either in direct form or in complemented form depending on the number of pulses or binary "1"s within the word. The binary word is transmitted in direct form if the number of binary "1"s is equal to or greater than $n/2$ and the binary word is transmitted in complemented form if the number of binary "1"s is lower than $n/2$, where n is equal to the total number of digits per word. In addition, to signal to the receiving station whether the word has been transmitted in complemented form or in direct form, an additional digit per word, called a guard digit, is transmitted.

However, this process has the drawback that, to keep the same data transmission capacity, it is necessary to increase the transmission rate since an additional bit must be transmitted.

SUMMARY OF THE INVENTION

An object of the present invention is to provide a polarity violation signalling process, free from the above-mentioned drawback, in the case of utilizing alternate polarity bipolar code of the type described in the above cited Patent.

Another object of the present invention is to provide sending and receiving circuits suitable for said signalling process.

A feature of the present invention is the provision of a signalling process for a PCM transmission system using alternate polarity bipolar code and disparity reduction comprising the steps of transmitting those words with the number of binary "1"s equal to or greater than $n/2$ in direct form according to the bipolar code, where $n$ is equal to the number of digits in a PCM word; transmitting those words with the number of binary "1"s less than $n/2$ in complemented form according to the bipolar code; and signalling the transmission of those words having one of the direct and complemented forms by a polarity violation of the bipolar code of one of the pulses of the words having the one of the direct and complemented forms.

Another feature of the present invention is the provision of a transmitter circuit for a PCM transmission system using alternate polarity bipolar code and disparity reduction comprising: a source of binary words to be transmitted according to the bipolar code; first means coupled to the source for determining the number of binary "1"s in each of the words, the first means producing a first control signal when the number of binary "1"s present in the words is less than $n/2$, where $n$ is equal to the number of digits of each of the words; second means coupled to the source to store each of the words while the first means determines the number of binary "1"s present in the corresponding one of the words; third means coupled to the first and second means responsive to the first control signal to complement each of the words at the output of the second means responsible for the first means producing the first control signal; fourth means coupled to the first means to produce a second control signal for controlling the polarity of the pulses to be transmitted; fifth means to shape the pulses to be transmitted, the fifth means having two inputs and one output, the output delivering pulses of either polarity depending upon which of the two inputs is excited; and sixth means coupled to the third, fourth and fifth means responsive to the second control signal to selectively excite either of the two inputs by each pulse from the third means; the fourth means including seventh means for alternately controlling the sixth means during the absence of the first control signal, and eighth means coupled to the first means and the seventh means to suppress the operation of the seventh means in response to the first control signal to provide a polarity violation of the bipolar code of one pulse of the words responsible for the first means producing the first control signal at the output of the first means.

Still another feature of the present invention is the provision of a receiver circuit for a PCM transmission system using alternate polarity bipolar code and disparity reduction comprising: a source of binary words in the bipolar code including therein a polarity violation of the bipolar code for a given pulse of certain of the words, the polarity violation indicating that the associated one of the words has been complemented at the transmitter of the system to achieve the disparity reduction; first means coupled to the source to store each of the words sequentially; second means coupled to the source to detect the polarity violation and produce a control signal in response to the polarity violation; and third means coupled to the first means and the second means responsive to the control signal to restore the associated ones of the words to its original form.

A further feature of the present invention is the provision of a PCM transmission system using alternate polarity bipolar code and disparity reduction comprising: a source of binary words to be transmitted according to the bipolar code; first means coupled to the source for determining the number of binary "1"s in each of the words, the first means producing a first control signal when the number of binary "1"s present in the words is less than $n/2$, where $n$ is equal to the number of digits of each of the words; second means coupled to the source to store each of the words while the first means determines the number of binary "1"s present in the corresponding one of the words; third means coupled to the first and second means responsive to the first control signal to complement each of the words at the output of the second means responsible for the first means producing the first control signal; fourth means coupled to the first means to produce a second control signal for controlling the polarity of the pulse to be transmitted; fifth means to shape the pulses to be transmitted, the fifth means having two inputs and one output, the output delivering pulses for transmission of either polarity according to the bipolar code depending on which of the two inputs is excited; sixth means coupled to the third source and fifth means responsive to the second control signal to selectively excite either of the two inputs by each pulse from the third means; the fourth means including fifth means for alternately controlling the sixth means during the absence of the first control signal, and eighth means coupled to the first and the seventh means to suppress the operation of the seventh means in response to the first control signal to provide a polarity violation of the bipolar code of one pulse of the words responsible for the first means producing the first control signal at the output of the first means; ninth means coupled to the fifth means to receive each of the words at the output of the fifth means; tenth means coupled to the ninth means to store each of the words sequentially; eleventh means coupled to the ninth means to detect the polarity violation and producing a third control signal in response to the polarity violation; and twelfth means coupled to the tenth means and the eleventh means responsive to the third control signal to restore those binary words associated with the polarity violation to their original form as present at the output of the source.

BRIEF DESCRIPTION OF THE DRAWING

Above-mentioned and other feature and objects of this invention will become more apparent by reference to the following description taken in conjunction with the accompanying drawing in which.

DESCRIPTION OF THE PREFERRED EMBODIMENT

The present invention relates to a PCM transmission system using an alternate polarity bipolar code wherein disparity reduction is effected. Such a disparity reduction is produced according to the method described in the above cited Patent as follows: each binary word or its complement is transmitted depending on the number of pulses in the word, that is, if the number of binary "1"s is equal to or greater than $n/2$, the binary word is sent in direct form, and if the number of binary "1"s is less than $n/2$, the binary word is sent in complemented form, where $n$ is equal to the total number of digits in a binary code word. This method is of interest since power spectral density for the code is very clearly increased at frequency $fr/2$ (fr being the digit repetition frequency) due to density increase of transmitted binary "1"s. This is illustrated in Curves 1 and 2 of FIG. 1 which respectively illustrate for the natural binary code and for the disparity reduction code, variations of $kW(y)$ with $y$, where $k$ is a proportionality coefficient, W is the used code power spectral density and $y$ is the ratio $f/fr$, f being the frequency. Probability calculations show that the proportion of transmitted binary "1"s is equal to 50 percent for the natural code and is equal to 64 percent with the disparity reduction code.

As already mentioned above, in the case of using a reduced disparity code, it is necessary to signal the transmission of complemented binary words so as to cause the original binary words to be restored at the receiving station. According to the above-cited Patent this signalling was performed by transmitting an additional digit at the beginning of each word, such a digit having, for example, the value "1" if the word was complemented and the value "0" if the word was not complemented.

Figure 1:
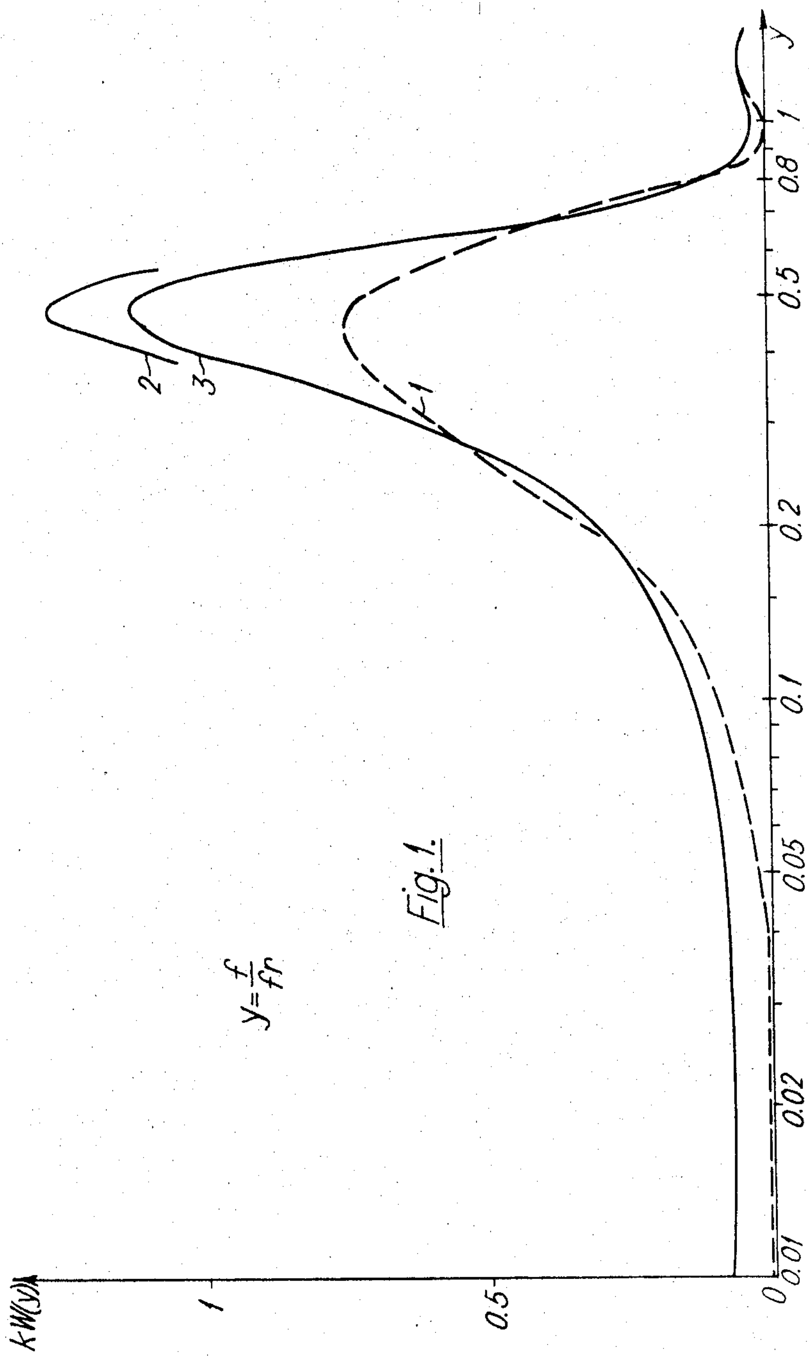
FIG. 1 is a diagram illustrating spectral densities for various codes.

The signalling process according to the present invention consists in effecting a violation of the normal polarity of one pulse of the transmitted bipolar code, for example, of the first bipolar pulse of a word, when that word is complemented. Such a polarity violation is detected at the receiving station and enables the original binary word to be restored. It has been demonstrated through calculations that such a signalling process does not substantially effect the reduced disparity code advantages and does not introduce drawbacks of substantial importance. Curve 3, FIG. 1 illustrates the calculated variations in frequency of polarity-violation reduced disparity code power spectral density. It should be noted that there remains a very significant spectral density increase at frequency $fr/2$ with respect to the natural code (Curve 1, FIG. 1). Moreover, the d.c. (direct current), component of transmitted signals is still a null.

It should be noted that there is an introduction of low frequency components detrimental to the amplitude of the maximum corresponding to frequency $fr/2$ , but as is apparent from Curve 3 the amplitude of these components is nevertheless very low.

The process according to the present invention has the advantage over the previously used process in that it does not require any transmission rate increase, since there is no additional digit to add, and that the process may be implemented by adding very simple equipment to existing terminal equipment as will be described hereinbelow.

Figure 2:
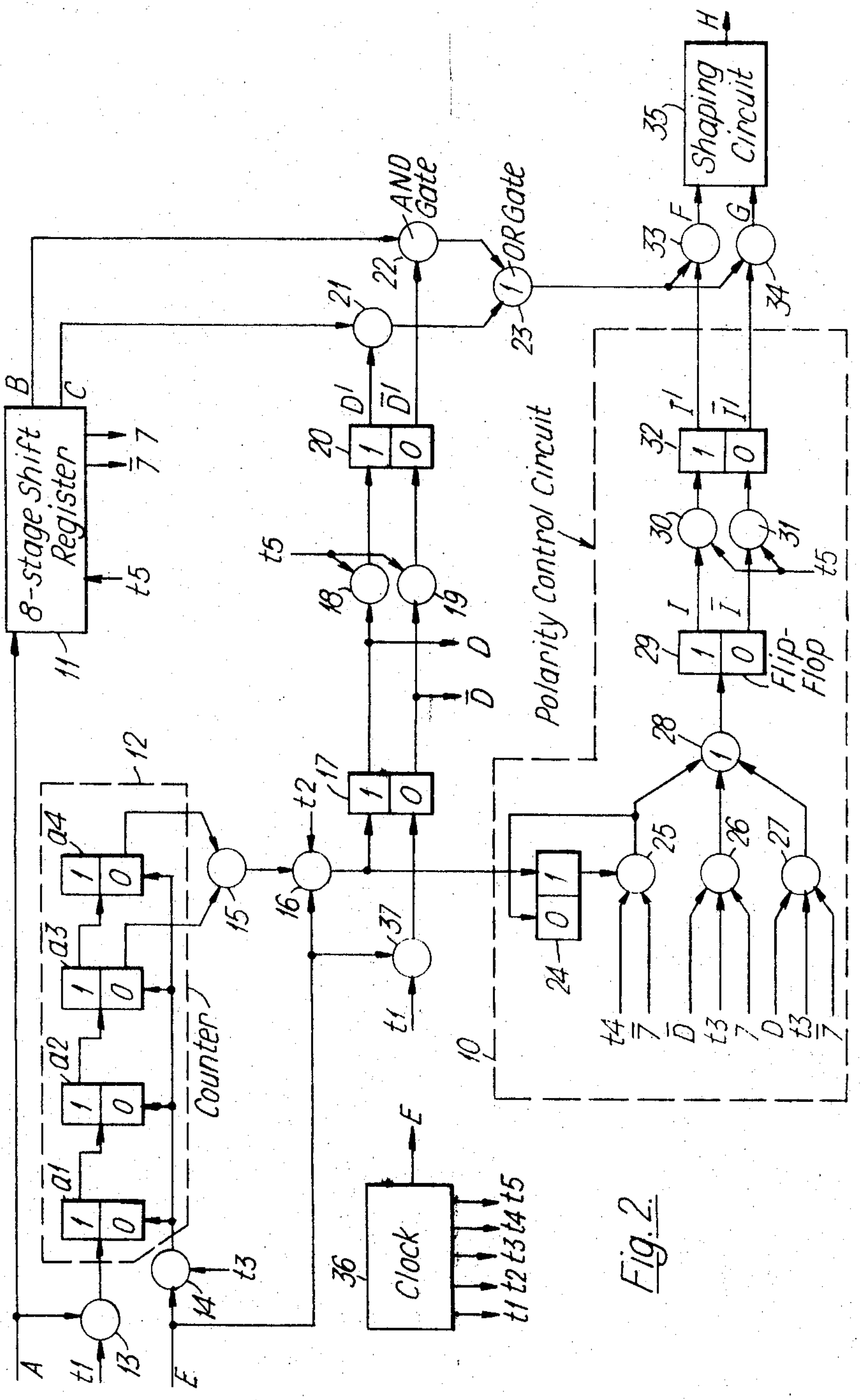
FIG. 2 is a circuit block diagram showing an embodiment of transmitting circuits in accordance with the principles of the present invention.

FIG. 2 illustrates an embodiment of the transmission circuits needed for implementing the signalling process in accordance with the present invention. These circuits essentially comprise an added polarity control circuit 10 for controlling polarity of the bipolar pulses to be transmitted, a shaping circuit 35 having two inputs and a single output providing output pulses of either one polarity or of the other polarity depending on the polarity of the pulses applied to each of the two inputs and a switching circuit including two AND gates 33 and 34 under control of circuit 10 for switching pulses to be transmitted toward either one or the other of the two inputs of circuit 35. First, the meaning of some of the logic symbols employed in FIGS. 2 and 4 will be explained. A symbol identified by numerals 33 and 34 represents an AND gate whose imputs are shown by arrows contacting the circle.

A symbol identified by numeral 23 including the number 1 surrounded by a circle represents an OR gate.

A symbol identified by numerals a1, 29 or 17 including a rectangle divided into two parts having a 1 and a 0 displayed therein, respectively, represents a binary flip flop. The output from part 1 provides a binary "1" output signal, for example, a positive signal, when the flip flop is in state 1 and a binary "0" output signal when the flip flop is in state 0 and conversely for the output from part 0.

A binary flip flop such as a1 or 29 having an input represented by an arrow contacting the partition line between the two parts switches its state each time a pulse is applied to that input.

A flip flop such as 17 is switched to state 1 or stays in that state when a pulse is applied to the input shown by an arrow contacting the part 1, and is switched to state 0 or stays in that state when a pulse is applied to the input represented by an arrow contacting the part 0.

Signals to be transmitted are represented by a signal A including binary words that are coded according to natural binary code. This signal A is applied, on the one hand, to an 8-stage shift register 11 and, on the other hand, via an AND gate 13 to a counter 12 having a capacity equal to the number of word digits, that is, in the described embodiment 8 digits. Counter 12 comprises four flip flops *a*1 to *a*4. Counter 12 is reset via AND gate 14. When the number of binary "1"s in a word is less than four, a complementing control signal is provided by AND gate 15 whose inputs are connected to the "0" outputs of flip flops *a*3 and *a*4. When these "0" outputs providing a binary "1" output, which is the situation when the number of binary "1"s is less than four, gate 15 provides a binary "1" input to the "1" inputs of flip flops 24 and 17 via AND gate 16. Flip flop 17 is reset via AND gate 37.

Data stored in flip flop 17 is transferred into flip flop 20 via AND gates 18 and 19. Flip flop 20 controls the switching on of AND gates 21 and 22 which are respectively connected to "0" output and "1" output of the last stage of register 11.

The outputs of gates 21 and 22 are connected to OR gate 23 that has its output connected to switching gates 33 and 34.

Polarity control circuit 10 essentially comprises flip flop 29 receiving signals from three AND gates 25, 26 and 27 through OR gate 28. The output of gate 25 is also used to reset flip flop 24. Data stored in flip flop 29 is transferred into flip flop 32 via AND gates 30 and 31. Flip flop 32 controls the switching-on of switching AND gates 33 and 34. Finally a clock 36 delivers various necessary timing signals $t_1$, $t_2$, $t_3$, $t_4$, $t_5$ and the word synchronization signal E.

Figure 3:
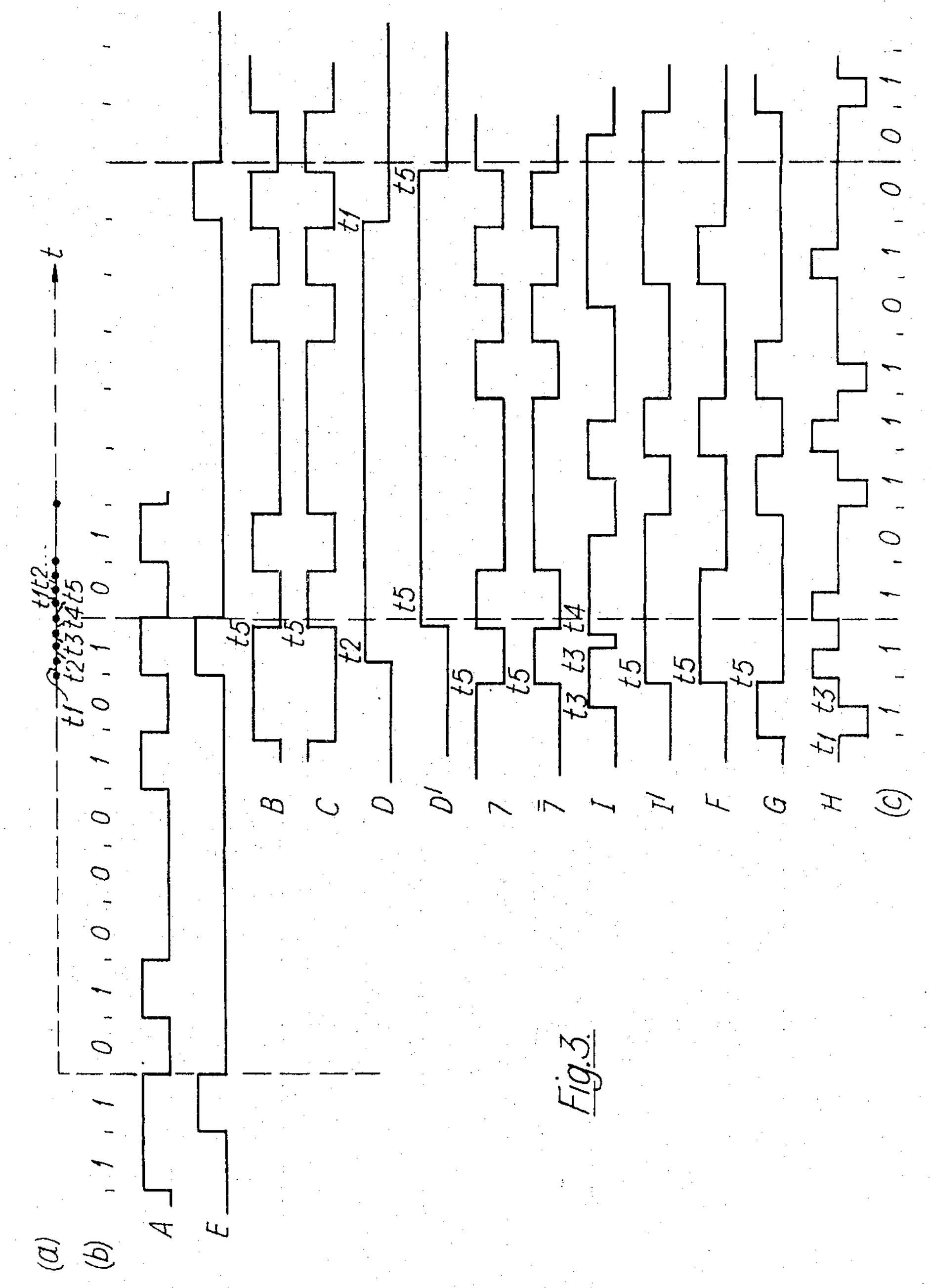
FIG. 3 illustrates waveforms of signals occurring in various places of the circuit of FIG. 2.

The above circuit operates as follows with reference to the timing diagram of FIG. 3 wherein the letter identifying a signal in FIG. 2 is likewise employed to identify the variuos curves of FIG. 3. In FIG. 3, the different words are separated by dotted vertical lines and the word synchronization signal E is illustrated in Curve E.

It is assumed that the word to be complemented as shown in Curve (*b*) is disposed between two words that are to be transmitted without complementing, parts only of these two words being illustrated. Each digit time slot is divided into five elementary time slots *t*1 to *t*5 provided by clock 36, FIG. 1. Those elementary time slots are, for example, those used the most often in PCM transmission, that is, the three time slots *t*1, *t*2 and *t*3 are each equal to a quarter of a digit time slot and the two time slots *t*4 and *t*5 are each equal to an eighth of a digit time slot as shown in Curve (*a*), FIG. 3. Above each waveform in FIG. 3 are written elementary time slots. The illustrated signals have their values varied at the beginning of these time slots. Signal A (Curve A, FIG. 3) is applied to shift register 11 which is shifted at time *t*5. Register 11 provides a signal B (Curve B, FIG. 3) at the "1" output of the eighth shift register stage. Thus, signal A appears as signal B with a delay substantially equal to the word duration. Signal C (Curve C, FIG. 3) at the "0" output of the eighth shift register stage is the complement of signal B. Signal A is also applied to counter 12, each pulse being applied to counter 12 at time t1 of the corresponding digit. At time t1 of the last digit of one word, that is, at time *t*1 of corresponding word synchronization signal E (Curve E, FIG. 3), if the number of binary "1"s in the involved word is less than four, which is the case in the described example, the two highest weight stages of counter 12 having a state equal to 0 (the "0" output of these two stages being a binary "1"). Thus, at time *t*2 of synchronization signal E, a pulse is transmitted through gate 16 and turns flip flops 17 and 24 into state 1, flip flip 17 having been reset at time *t*1 of signal E. At time *t*3 of signal E, counter 12 is reset via gate 14 and, thus, is ready to resume counting for the next word. State 1 of flip flop 17, signal D (Curve D, FIG. 3) is recopied at time t5 of signal E into flip flop 20. Flip flop 20 controls by signals D′ (Curve D′, FIG. 3) and $\overline{D'}$ the turning-on of gate 21 and turning-off of gate 22 at the time when the beginning of a word to be transmitted appears from the outputs of register 11 producing signals B and C. From this time *t*5 on, it is the signal C which is transmitted, that is, the binary word complement. Transmitted pulse polarity is determined by polarity control circuit 10. For this purpose, the polarity of each pulse to be transmitted is determined during the digit time slot preceding that pulse by using outputs 7 and $\overline{7}$ (Curves 7 and $\overline{7}$, FIG. 3) from the seventh stage of shift register 11, these outputs indicating in advance by one digit time slot whether or not there will be a pulse to be transmitted. During transmission of the word preceding the considered word, where the preceding word is not complemented, output 7 is used to control via gate 26 the switching of flip flop 29 at time t3 of each pulse to be transmitted. Flip flop 24 is in state 0 and signal D is a null and, thus, gates 25 and 27 were turned off. The state of flip flop 29 was recopied at time $t5$ by AND gates 30 and 31 into flip flop 32. Thus, at the time when pulses have switched flip flop 29 the output to be transmitted is signal B.

From time t2 of signal E preceding occurrence of the first digit of the considered word from the output of shift register 11, flip flops 17 and 24 are switched to state 1 and, therefore, signal $\bar{7}$ will from that time on control the switching of flip flop 29 via AND gate 27 at time $t3$ of the pulses from $\bar{7}$. When the first pulse of the considered word occurs, which has to be transmitted in the next digit time slot, flip flop 29 is switched at time $t3$ and flip flop 24 is in state 1. At time $t4$ flip flop 29 is reset to its initial state by a pulse delivered by AND gate 25. This same pulse also resets flip flop 24 (Curve I, FIG. 3). Due to the fact that the state transfer from flip flop 29 to flip flop 32 is only made at time $t5$, such a double switching of flip flop 29 is not recopied (Curve I', FIG. 3) and the polarity violation is produced on the first pulse of the complemented word. Then AND gate 25 no longer intervenes and alternate polarity of pulses to be transmitted is controlled via AND gate 27. Signals F and G (Curves F and G, FIG. 3) control respectively positive and negative polarity of pulses delivered, signal H, (Curve H, FIG. 3) by shaping circuit 35 having the shaping factor one-half. The transmitted binary word is shown in Curve (*c*), FIG. 3.

Figure 4:
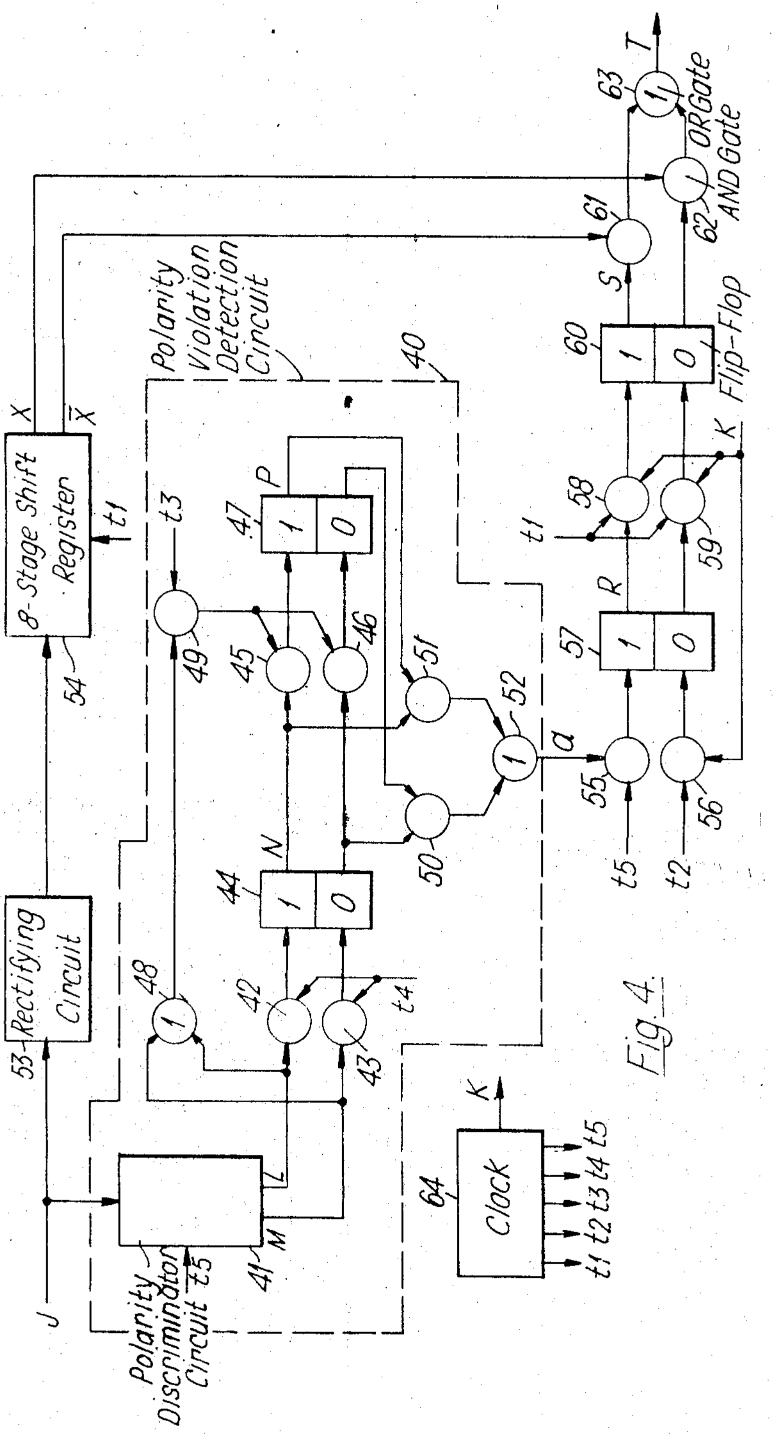
FIG. 4 is a circuit block diagram illustrating an embodiment of receiving circuits in accordance with the principles of the present invention.

FIG. 4 illustrates an embodiment of receiving circuits needed for implementing the signalling process according to the present invention. Those circuits essentially comprise an added polarity violation detection circuit 40 controlling a restoring circuit for restoring the original signal. Received signal J includes a sequence of bipolar pulses forming the binary words in direct form or in complemented form, the complemented binary words being produced at the transmission station. Signal J is applied, on the one hand, to an eight-stage shift register 54 via a rectifying circuit 53. The "1" output of the eighth stage of register 54 delivers signal X and the "0" output of the eighth stage of register 54 delivers signal $\bar{X}$. Signals X and $\bar{X}$ are respectively connected to selection AND gates 62 and 61 followed by OR gate 63 delivering the restored signal T.

On the other hand, signal J is applied to a polarity discriminator circuit 41 which may comprise, for example, two diodes that are both connected in a reverse direction from one another to the input of circuit 41 with each of the diodes being connected to the "1" input of a flip flop which is reset at time $t5$. Outputs L and M respectively deliver pulses when positive and negative pulses are present in signal J. Outputs L and M control state switching of flip flop 44 via AND gates 42 and 43. On the other hand, a pulse either from L or from M controls through OR gate 48 and AND gates 49, 45 and 46 transfer of state from flip flop 44 to flip flop 47. A comparator circuit, including AND gates 50 and 51 and OR gate 52, compares at each time the contents of flip flops 44 and 47, and delivers a positive signal Q if the contents are identical. Signal Q controls the switching of flip flop 57 to state 1 via AND gate 55, flip flop 57 being reset via AND gate 56. The state of flip flop 57 is recopied into flip flop 60 via AND gates 58 and 59. The "1" and "0" outputs of flip flop 60 respectively control selection gates 61 and 62. Finally, a clock 64, that is synchronized in a known manner to the input signal J, delivers the various necessary time signals $t_1$, $t_2$, $t_3$, $t_4$ and $t_5$ and word synchronization signal K.

Figure 5:
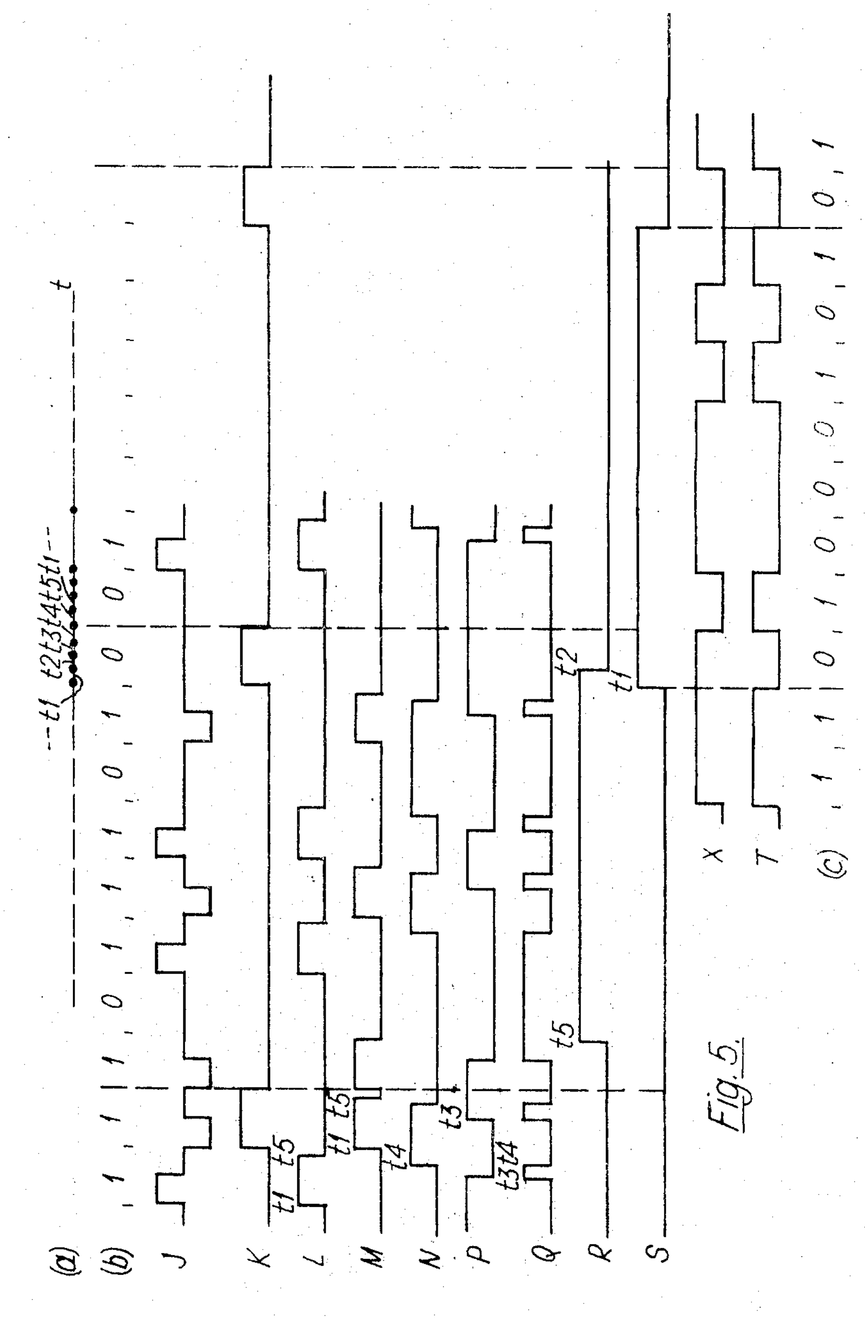
FIG. 5 illustrates waveforms of signals occurring in various places of the circuit of FIG. 4.

Such a circuit operates as follows with reference to FIG. 5 wherein the letter identifying a signal in FIG. 4 is likewise employed to identify the various Curves of FIG. 5. In FIG. 5, elementary time slots $t1$ to $t5$ are shown in Curve (a) and are identical to those used at the transmission station. Signal K (Curve K, FIG. 5) is the word synchronization signal.

Rectified signal J is applied to input of shift register 54 wherein shifts are performed at times $t1$. Register 54 stores signal J for seven digit time slots. In the described example, the received word is the complemented word that has been considered above. It is between two noncomplemented words which are only partially shown. Thus, signal X (Curve X, FIG. 5) reproduces contents of signal J delayed by seven digit time slots. Positive pulses of signal J (Curve J, FIG. 5) applied to discriminator 41 are switched to output L (Curve L, FIG. 5) while negative pulses thereof are switched to output M (Curve M, FIG. 5). Each pulse from L lasts from time $t1$ to time $t5$ and turns flip flop 44 into state 1 or maintains it in that state at time $t4$ while pulses from M turns flip flop 44 to state 0 or maintains it in this state. State changes for flip flop 44 are represented by signal N (Curve N, FIG. 5) from the "1" output of flip flop 44. At time $t3$ of either pulse L or M, that is, before they are applied to flip flop 44 , data stored in flip flop 44 is transferred into flip flop 47 whose state changes are represented by signal P(Curve P, FIG. 5). Thus, at time $t4$, comparator 50, 51, 52 allows received pulse polarity, represented by the state of flip flop 44, to be compared with previously received pulse polarity, represented by the state of flip flop 47. The comparison result, signal Q, (Curve Q, FIG. 5) is applied at $t5$ to the "1" input of flip flop 57. When a polarity violation has occured in a received bipolar word such an abnormal polarity pulse will have a polarity identical to that of the preceding pulse. Thus, at time $t4$ of the abnormal polarity pulse the states of flip flops 44 and 47 become identical and remain so up to time $t4$ of the next pulse. At time $t5$ of the abnormal polarity pulse, flip flop 57 is switched to state 1 and produces signal R (Curve R, FIG. 5). At time $t1$ of the next word synchronization pulse K, flip flop 60 is in turn switched to state 1 and controls switching-on of gate 61 by signal S, (Curve S, FIG. 5) when the word, that has just been analyzed, is available on the outputs of the eighth stage of shift register 54. At time $t2$ of the synchronization pulse, flip flop 57 is reset so as to be ready to store a possible signalling during analysis of the next word. However, flip flop 60 stays in its state 1 for the whole duration of the considered word, which corresponds to selection of the complement or signal X of this word for coupling to output T (Curve T, FIG. 5). Thus, at output T, due to detection of polarity violation signalling a complementing operation at transmission station, the original word is restored which is represented in Curve (*c*), FIG. 5 and in Curve (*b*), FIG. 3.

Obviously, from the above description, polarity violation could be performed on a pulse other than the first word pulse. In this respect, at the transmission station it would be sufficient to authorize pulse transfer from AND gate 25 to flip flops 24 and 29 only during the $p^{th}$ word pulse delivered by AND gate 27. The receiver circuits would remain unchanged.

Further, it is clear that polarity violation could signal the direct form of the transmitted binary words instead of the complemented form of transmitted binary words.

While we have described above the principles of our invention in connection with specific apparatus it is to be clearly understood that this description is made only by way of example and not as a limitation to the scope of our invention as set forth in the objects thereof and in the accompanying claims.

We claim:

1. A transmitter circuit for a PCM transmission system using alternate polarity bipolar code and disparity reduction comprising:
   a source of binary words to be transmitted according to said bipolar code;
   first means coupled to said source for determining the number of binary "1"s in each of said words, said first means producing a first control signal when the number of binary "1"s present in said words is less than $n/2$, where $n$ is equal to the number of digits of each of said words;
   second means coupled to said source to store each of said words while said first means determines the number of binary "1"s present in the corresponding one of said words;
   third means coupled to said first and second means responsive to said first control signal to complement each of said words at the output of said second means responsible for said first means producing said first control signal;
   fourth means coupled to said first means to produce a second control signal for controlling the polarity of the pulses to be transmitted;
   fifth means to shape the pulses to be transmitted, said fifth means having two inputs and one output, said output delivering pulses of either polarity depending upon which of said two inputs is excited;and
   sixth means coupled to said third, fourth and fifth means responsive to said second control signal to selectively excite either of said two inputs by each pulse from said third means;
   said fourth means including
      seventh means for alternately controlling said sixth means during the absence of said first control signal, and
      eighth means coupled to said first means and said seventh means to suppress the operation of said seventh means in response to said first control signal to provide a polarity violation of said bipolar code of one pulse of said words responsible for said first means producing said first control signal at said output of said first means.

2. A circuit according to claim 1, wherein
   said one pulse is the first pulse of said words responsible for said first means producing said first control signal.

3. A PCM transmission system using alternate polarity bipolar code and disparity reduction comprising:
   a source of binary words to be transmitted according to said bipolar code;
   first means coupled to said source for determining the number of binary "1"s in each of said words, said first means producing a first control signal when the number of binary "1"s present in said words is less than $n/2$, where $n$ is equal to the number of digits of each of said words;
   second means coupled to said source to store each of said words while said first means determines the number of binary "1"s present in the corresponding one of said words;
   third means coupled to said first and second means responsive to said first control signal to complement each of said words at the output of said second means responsible for said first means producing said first control signal;
   fourth means coupled to said first means to produce a second control signal for controlling the polarity of the pulse to be transmitted;
   fifth means to shape the pulses to be transmitted, said fifth means having two inputs and one output, said output delivering pulses for transmission of either polarity according to said bipolar code depending on which of said two inputs is excited;
   sixth means coupled to said third fourth and fifth means responsive to said second control signal to selectively excite either of said two inputs by each pulse from said third means;
   said fourth means including
      seventh means for alternately controlling said sixth means during the absence of said first control signal, and
      eighth means coupled to said first and said seventh means to suppress the operation of said seventh means in response to said first control signal to provide a polarity violation of said bipolar code of one pulse of said words responsible for said first means producing said first control signal at said output of said first means;
   ninth means coupled to said fifth means to receive each of said words at said output of said fifth means;
   tenth means coupled to said ninth means to store each of said words sequentially;
   eleventh means coupled to said ninth means to detect said polarity violation and producing a third control signal in response to said polarity violation; and
   twelfth means coupled to said tenth means and said eleventh means responsive to said third control signal to restore those binary words associated with said polarity violation to their original form as present at the output of said source.

4. A system according to claim 3, wherein
   said eleventh means includes
      thirteenth means coupled to said ninth means for detecting the polarity of the pulses of said words in said bipolar code, and
      fourteenth means coupled to said thirteenth means to compare the polarity of each two successive pulses of said words in said bipolar code to produce said third control signal when the polarity of said two successive pulses are identical.

* * * * *